(12) United States Patent
Martin (10) Patent No.: US 11,149,786 B2
(45) Date of Patent: Oct. 19, 2021

(54) CARRIER JOURNAL WITH ANTI-ROTATION FEATURE

(71) Applicant: PRATT & WHITNEY CANADA CORP., Longueuil (CA)

(72) Inventor: Bruno Martin, Saint-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/804,510

(22) Filed: Feb. 28, 2020

(65) Prior Publication Data
US 2021/0270316 A1 Sep. 2, 2021

(51) Int. Cl.
F16H 57/08 (2006.01)
F16C 19/16 (2006.01)
F16H 1/28 (2006.01)

(52) U.S. Cl.
CPC .............. *F16C 19/16* (2013.01); *F16H 1/28* (2013.01); *F16H 57/082* (2013.01); *F16C 2361/61* (2013.01); *F16H 2057/085* (2013.01)

(58) Field of Classification Search
CPC ............ F02C 7/36; F05D 2260/40311; F16H 2048/085; F16C 2361/61
See application file for complete search history.

(56) References Cited

U.S. PATENT DOCUMENTS

| | | | | |
|---|---|---|---|---|
| 2,127,463 A | * | 8/1938 | Chilton | F16H 1/2836 475/347 |
| 3,821,908 A | * | 7/1974 | Marsch | F16H 57/0482 475/159 |
| 3,880,483 A | | 4/1975 | Snyder | |
| 4,722,244 A | * | 2/1988 | Tsuchiya | F16H 48/08 475/221 |
| 4,756,212 A | * | 7/1988 | Fuehrer | F16H 57/0479 475/159 |
| 4,901,601 A | * | 2/1990 | Leggat | F16H 57/082 29/893.1 |
| 4,983,152 A | * | 1/1991 | Kimberlin | F16H 1/28 475/331 |
| 4,998,909 A | * | 3/1991 | Fuehrer | F16H 57/082 475/331 |

(Continued)

FOREIGN PATENT DOCUMENTS

CN 101936367 A 1/2011
CN 201866054 U 6/2011
(Continued)

*Primary Examiner* — Sherry L Estremsky
(74) *Attorney, Agent, or Firm* — Norton Rose Fulbright Canada LLP (57) ABSTRACT

A journal bearing assembly for rotatably supporting a gear in a gear system. The journal bearing assembly comprises a journal bearing for rotatably supporting the at least one gear. The journal bearing includes an engagement feature at a distal end thereof. The distal end is insertable into an opening in a gear carrier of the gear system. The opening includes an anti-rotation feature engageable with the engagement feature to block the journal bearing from rotating about an axis extending longitudinally through the center of the journal bearing. The journal bearing assembly further includes a fastening feature for fastening the journal bearing to the gear carrier.

16 Claims, 7 Drawing Sheets

(56) References Cited

U.S. PATENT DOCUMENTS

| | | | |
|---|---|---|---|
| 5,269,607 A | 12/1993 | Lawson | |
| 5,700,218 A | 12/1997 | VanSelous et al. | |
| 6,023,836 A * | 2/2000 | Matsuoka | F16D 25/0638 29/557 |
| 6,652,408 B2 * | 11/2003 | Rutt | F16H 48/08 475/230 |
| 8,186,903 B2 | 5/2012 | Makin et al. | |
| 8,251,862 B2 * | 8/2012 | Burgman | F28F 9/262 475/348 |
| 8,333,678 B2 * | 12/2012 | McCune | F01D 25/162 475/331 |
| 8,998,769 B2 | 4/2015 | Hagerdorn | |
| 9,115,756 B2 | 8/2015 | Tecza | |
| 9,121,429 B2 | 9/2015 | Hartman et al. | |
| 9,726,214 B2 | 8/2017 | Olbrich et al. | |
| 10,443,708 B2 | 10/2019 | Sheridan | |
| 10,495,185 B2 | 12/2019 | Martin et al. | |
| 10,760,678 B2 * | 9/2020 | Sevagen | F16H 1/28 |
| 10,816,086 B2 * | 10/2020 | Hasting | F16H 57/0479 |
| 2011/0269593 A1 | 11/2011 | Knowles | |
| 2015/0148183 A1 * | 5/2015 | Chae | F16H 57/082 475/331 |
| 2015/0330498 A1 * | 11/2015 | Carlino | F16H 57/08 475/159 |
| 2015/0354694 A1 * | 12/2015 | Degenhart | B23P 15/14 475/331 |
| 2019/0136954 A1 * | 5/2019 | Ogawa | F16H 48/38 |
| 2019/0203648 A1 | 7/2019 | Sheridan et al. | |
| 2020/0025285 A1 * | 1/2020 | Matsuoka | F16H 57/082 |

FOREIGN PATENT DOCUMENTS

| | | | |
|---|---|---|---|
| CN | 203926726 U | 11/2014 | |
| CN | 205401609 U | 7/2016 | |
| CN | 103582544 B | 10/2016 | |
| CN | 104868652 B | 2/2018 | |
| CN | 107795222 A | 3/2018 | |
| CN | 207132064 U | 3/2018 | |
| CN | 108749801 A | 11/2018 | |
| CN | 108811494 A | 11/2018 | |
| CN | 208774750 U | 4/2019 | |
| CN | 109973611 A | 7/2019 | |
| CN | 209262204 U | 8/2019 | |
| DE | 3645346 C2 | 8/1997 | |
| DE | 10305408 B3 | 7/2004 | |
| DE | 102006054898 A1 | 6/2007 | |
| DE | 102007041184 B4 | 7/2011 | |
| DE | 102012111487 A1 | 5/2014 | |
| EP | 722051 A2 | 7/1996 | |
| EP | 1686290 A1 | 8/2006 | |
| EP | 3093534 A1 | 11/2016 | |
| EP | 3290751 A1 | 3/2018 | |
| GB | 1411299 A | 10/1975 | |
| IN | 315051 B | 7/2019 | |
| WO | 2007017113 A1 | 2/2007 | |
| WO | 2010020288 A1 | 2/2010 | |
| WO | WO-2012039113 A1 * | 3/2012 | F16H 48/08 |
| WO | 2018059984 A1 | 4/2018 | |
| WO | 2019149188 A1 | 8/2019 | |
| WO | WO-2020005872 A1 * | 1/2020 | B22F 5/08 |

* cited by examiner

CARRIER JOURNAL WITH ANTI-ROTATION FEATURE

TECHNICAL FIELD

The application relates generally to mounting devices for rotating assemblies of gas turbine engines and, more particularly, to journal bearings in carrier assemblies for such engines.

BACKGROUND OF THE ART

Turbine engines typically includes a number of rotating components or parts mounted together via mounting devices providing suitable support and allowing axial and/or rotational movement between such components. Those mounting devices may include journal bearings for rotatably supporting gears in a planet gear assembly or the like with one or more gear carriers. Pins and locking keys may be used to lock the journal bearing to the gear carrier. However, such systems may create undesirably high local stresses in the key slot areas. In addition, while single part journal shafts are more desirable than separate pin and shaft designs, they may not provide enough radial space for keyhole and anti-rotation features.

SUMMARY

In one aspect, there is provided a journal bearing assembly for rotatably supporting a gear in a gear system, the journal bearing assembly comprising a journal bearing for rotatably supporting the at least one gear, the journal bearing including an engagement feature at a distal end thereof, the distal end insertable into an opening in a gear carrier of the gear system, the opening including an anti-rotation feature engageable with the engagement feature to block the journal bearing from rotating about an axis extending longitudinally through the center of the journal bearing, and a fastening feature for fastening the journal bearing to the gear carrier.

In another aspect, there is provided a gear system for a gas turbine engine, comprising a gear carrier defining a carrier opening extending along an axis, a journal bearing disposed on a first side of the gear carrier, the journal bearing removably received in the carrier opening, the journal bearing defining a bore along the axis, a slot in one of the carrier opening and a distal end of the journal bearing and a protrusion in the other one of the carrier opening and the distal end of the journal bearing, the slot and the protrusion mated with one another to secure the journal bearing against rotation about the axis relative to the gear carrier, and a fastening feature disposed on a second side of the gear carrier, the second side being opposite the first side, the fastening feature removably received in the bore to secure the journal bearing against movement relative to the gear carrier along the axis.

In a further aspect, there is provided a method for installing a journal bearing including an engagement feature at a distal end thereof into a gear carrier of a gear system, comprising inserting the distal end into an opening in the gear carrier with an anti-rotation feature configured to engage with the engagement feature to block the journal bearing from rotating, and fastening the journal bearing to the gear carrier via a fastening feature.

DESCRIPTION OF THE DRAWINGS

Reference is now made to the accompanying figures in which.

DETAILED DESCRIPTION

Figure 1:
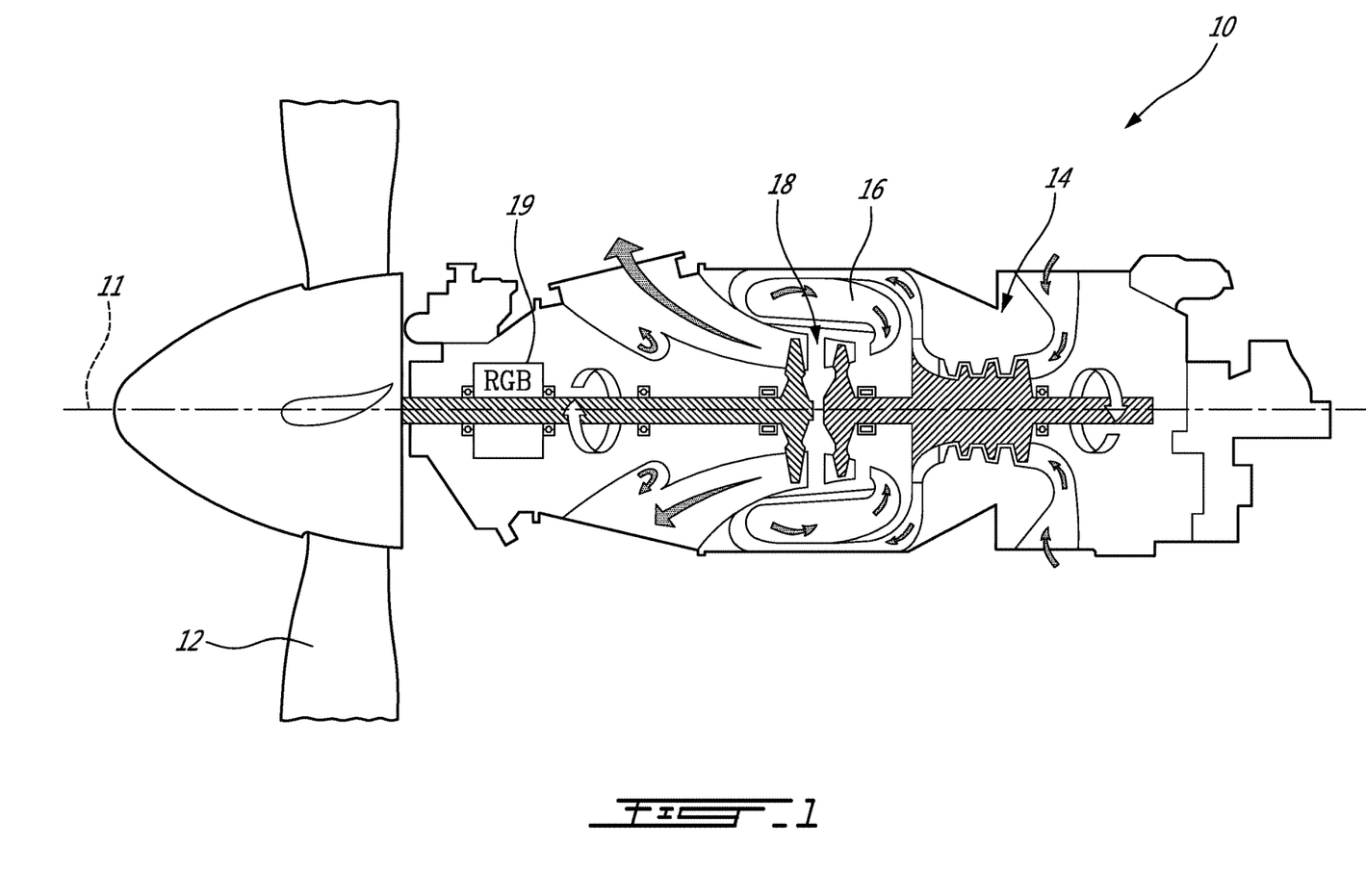
FIG. 1 is a schematic cross sectional view of a gas turbine engine with a journal bearing assembly of the present disclosure.

FIG. 1 illustrates a gas turbine engine 10 of a type preferably provided for use in subsonic flight and configured for driving a load 12, such as, but not limited to, a propeller or a helicopter rotor or rotorcraft rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10. Even though the present description specifically refer to a turboprop engine as an example, it is understood that aspects of the present disclosure may be equally applicable to other types of combustion engines in general, and other types of gas turbine engines in particular, including but not limited to turboshaft or turbofan engines, auxiliary power units (APU), and the like.

The gas turbine engine 10 also includes rotating parts or assemblies, such as gear assemblies 19 (e.g., epicycle reduction systems, planetary/reduction gearboxes (RGB), or other types of rotating assemblies) with rotating components mounted thereto using mounting devices allowing rotational and/or axial movement. In the embodiment shown, the gear assembly 19 is mounted at the front end of the engine 10, though it may be at other locations in the engine 10. In the depicted embodiment, the gear assembly 19 is part of an epicycle reduction system, also known as epicyclic gear train, epicyclic gearbox, planetary gearbox, etc., and, as a person of skill in the art would understand, includes a sun gear, a plurality of planet gears each rotatably connected to a carrier, and a ring gear. In such a system, a plurality of journal bearing assemblies may be utilized for interfacing a given planet gear to a corresponding carrier.

Figure 2:
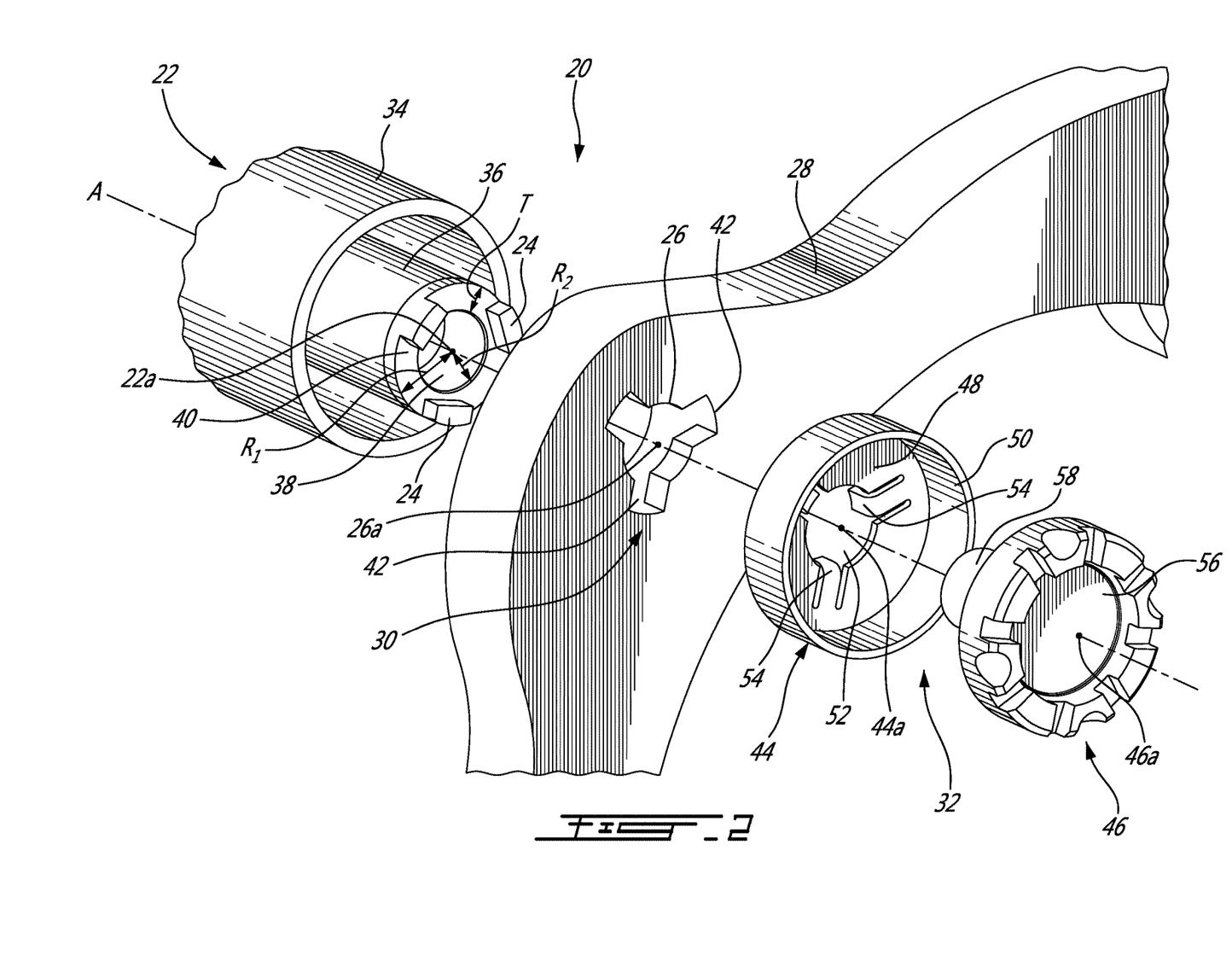
FIG. 2 is an exploded perspective a journal bearing assembly, according to an embodiment of the present disclosure.
Figure 3:
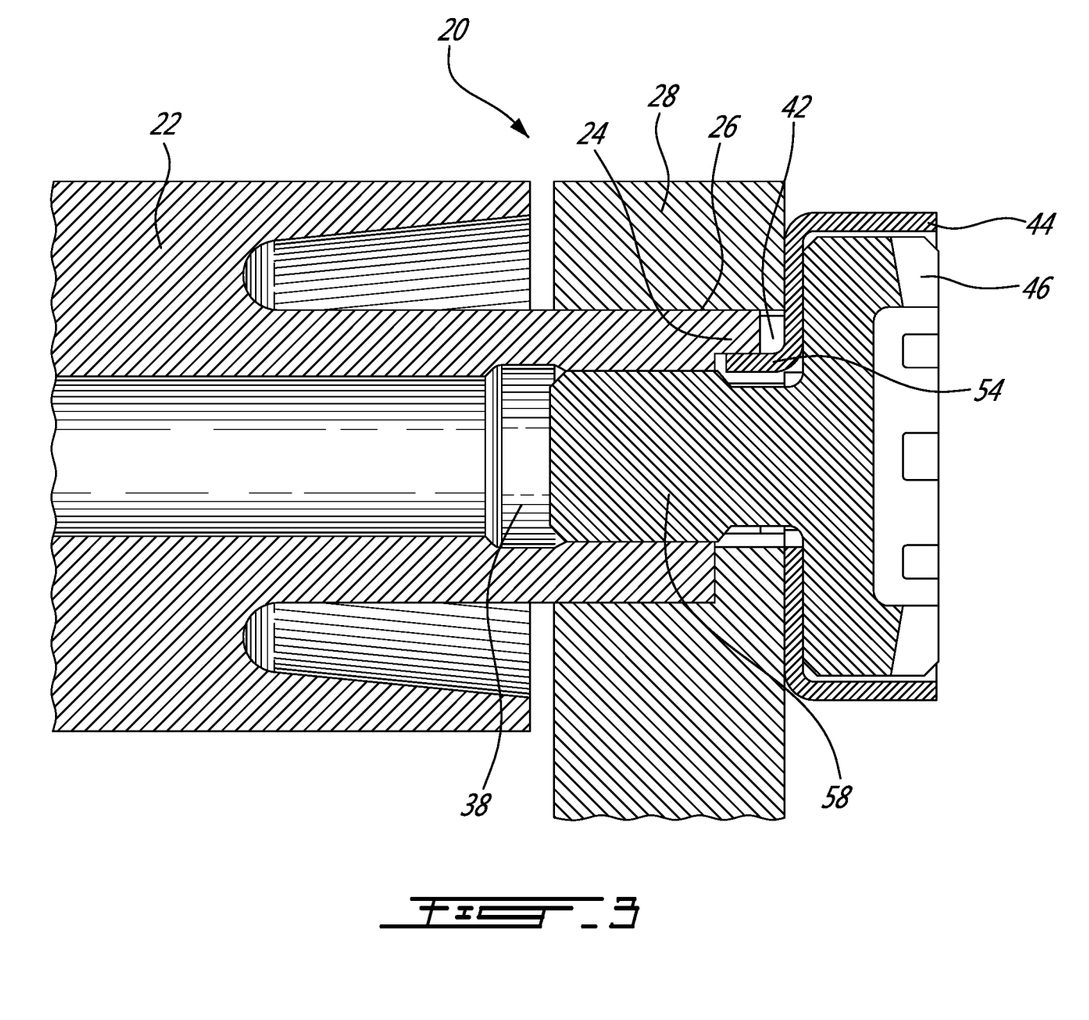
FIG. 3 is a longitudinal sectional view of the journal bearing assembly such as shown in FIG. 2.

Referring now to FIGS. 2 and 3, there is shown a pin-less journal bearing assembly 20 for rotatably supporting one or more one gears (not shown) in a gear assembly 19. As will be discussed in further detail below, a journal bearing 22 with an engagement feature such as one or more protrusions 24 at a distal end thereof is insertable into a first side of an opening 26 in a gear carrier 28. The journal bearing 22 may be referred to in some embodiments as a support member. The opening 26 includes an anti-rotation feature 30 that is configured to engage with the protrusion 24 to prevent the journal bearing 22 from rotating about an axis A extending longitudinally through the center of the journal bearing 22. The journal bearing assembly 20 is said to be pinless as the journal bearing 22 is mounted directly to the carrier 28, i.e., without a pin. Once the journal bearing 22 has been inserted into the opening 26 and the anti-rotation feature 30 has been engaged, a fastening feature 32 is provided on a second side of the gear carrier 28 opposite the first side to fasten the journal bearing 22 to the gear carrier 28, thus locking the journal bearing 22 to the gear carrier 28 in a non-rotatable fashion and readying the journal bearing assembly 20 for supporting the one or more gears in the gear assembly 19. Such locking is accomplished without the need for pins or locking keys, offering a stiff and robust assembly against standard journal bearing behaviour. In an alternate embodiment, the engagement feature at the distal end of the journal bearing 22 may include a slot, groove or the like (not shown) and the anti-rotation feature 30 in the opening 26 of the carrier 28 may include a pin-like protrusion configured to engage with the engagement feature at the distal end of the journal bearing 22 when inserted into the opening 26. Thus, in such an embodiment, a slot at the distal end of the journal bearing 22 may receive a protrusion disposed in the opening 26 of the carrier 28 to block rotation of the journal bearing 22. The engagement feature could also be a flat portion on the outer surface wall of the journal bearing 22, for example. The journal bearing 22 may be without a protrusion 24, with an outer surface 34 thereof received directly in the opening 26 of the carrier 28.

The journal bearing 22 is depicted in FIG. 2 as a pin-less journal, which may also be referred to as a journal shaft, but in other embodiments it may take the form of other shaft-type supporting elements typically found in a gas turbine engine 10, for example for supporting a gear. Journal bearing 22 may have a cylindrically shaped outer surface 34 for rotatably supporting the one or more gears. Though the outer surface 34 is shown as cylindrical, it could have other shapes, such as frusto-conical, and may have surface features, such as grooves, slots, channels. In the embodiment shown in FIG. 2, the protrusion(s) 24 emanates in an axial direction from an inner tubular member 36 of the journal bearing 22 at distal end(s) thereof. In this embodiment, the journal bearing 22 includes three protrusions 24 arranged radially and evenly spaced around a cylindrical bore 38 at the center of an annular end face 40 from which the protrusions 24 emanate. The protrusions 24 in an embodiment may be described as crenellations. The annular end face 40 has a radial thickness T corresponding to the difference between a radius R1 of the inner tubular member 36 and a radius R2 of the cylindrical bore 38. These values, along with the depth and shape of the cylindrical bore 38, may vary to accommodate various types fastening features 32, as will be discussed in further detail below. While FIG. 2 demonstrates a journal bearing 22 with three protrusions 24, subsequent figures will illustrate other possible arrangements.

As shown in FIG. 2, the anti-rotation feature 30 in the carrier opening 26 is configured to receive the protrusion(s) 24 of the journal bearing 22. In the shown embodiment, the anti-rotation feature 30 includes one or more radially-arranged slots 42 around the carrier opening 26. In an embodiment, the number and pattern or spatial arrangement of radially-arranged slots 42 correspond to the number and arrangement of journal bearing protrusions 24, and the shape and dimensions of the slots 42 may correspond to those of the protrusions 24 as well. As such, when the protrusions 24 are inserted into the carrier opening 26, each protrusion 24 snugly engages with a corresponding slot 42 in a non-rotatable fashion. Other arrangements of sets of sets of complementary slots and protrusions are possible, such as a single protrusion 24 for multiple slots 42, with the protrusion 24 accommodated in one of the numerous slots 42. In an embodiment, the height of the protrusions 24 is less than the thickness of the gear carrier 28 so that the annular end face 40 of the journal bearing 22 abuts a side of the carrier 28 when the protrusions 24 are engaged with the anti-rotation feature 30.

Once the journal bearing 22 is inserted into the carrier opening 26 so that the protrusions 24 are engaged with the anti-rotation feature 30, the fastening feature 32 may be used to securely fasten or lock the journal bearing 22 to the gear carrier 28, and its eventual removal similarly unfastens or unlocks the journal bearing 22 from the gear carrier 28, for example for maintenance or replacement purposes. As shown in FIG. 2, in an embodiment the fastening feature 32 includes a washer such as a cup washer 44 and a fastener such as a bolt 46. However, other types of fasteners may be used to the same effect, such as various types of screw or rivets. In the embodiment shown in FIG. 2, the cup washer 44 is cup shaped and includes a base 48, a cylindrical circumferential sidewall 50 and a hole 52. One or more tang or finger 54, which may in an embodiment be flexible, extends outwardly from the base 48. In an embodiment, the number of tangs 54 corresponds to the number of journal bearing protrusions 24, though a single tang 54 or fewer tangs 54 may suffice for numerous protrusions 24 and/or numerous slots 42. As such, the tangs 54 are insertable into the carrier opening 26 so that they engage with the protrusions 24 in the slots 42, as shown in FIG. 3.

Figure 9:
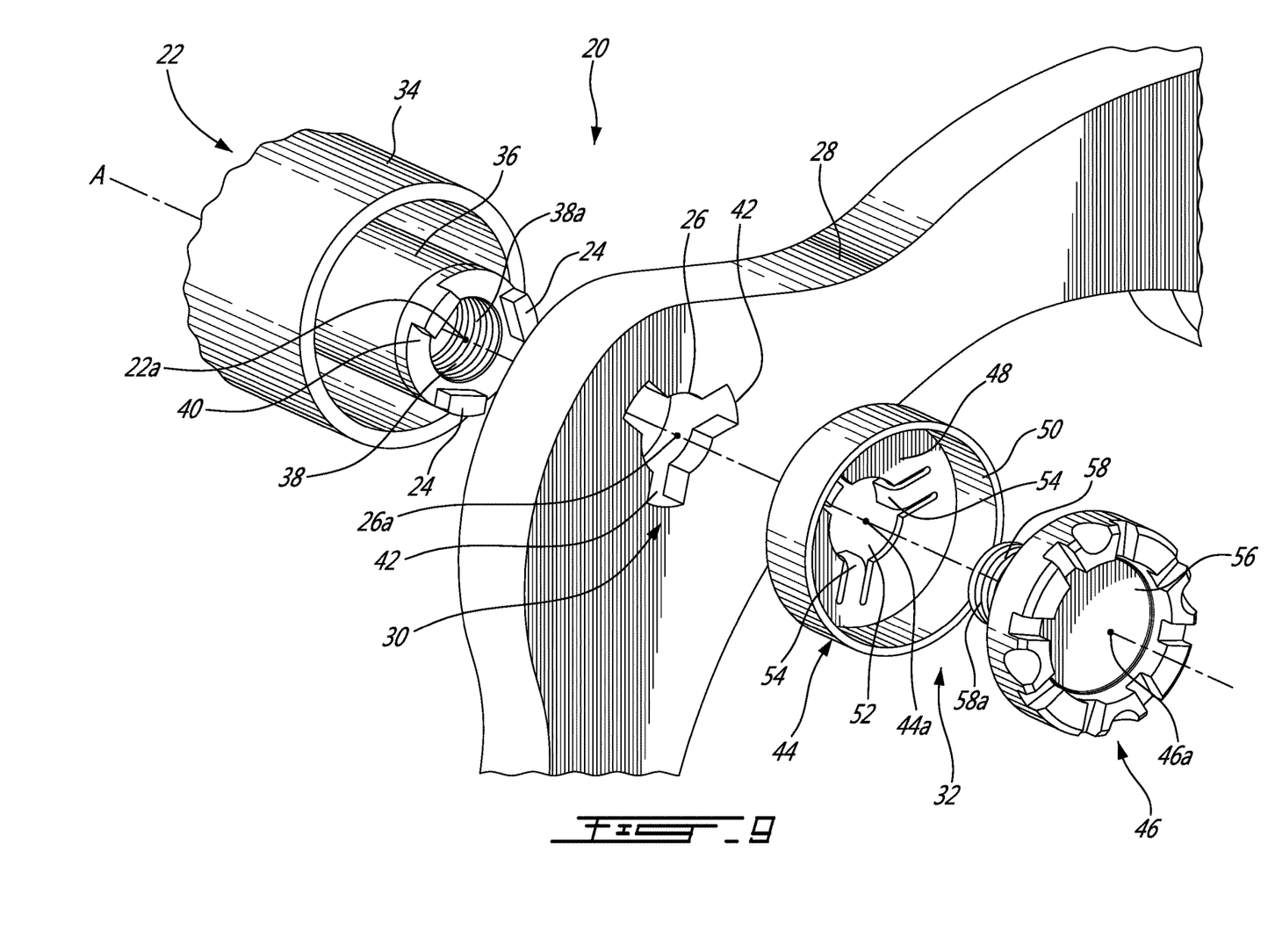
FIG. 9 is a perspective view of a journal bearing for a journal bearing assembly, according to another embodiment of the present disclosure.

To secure the journal bearing 22 to the gear carrier 28, the bolt 46 with a head 56 and a shank 58 is insertable through the cup washer hole 52 and the carrier opening 26. In an embodiment, the shank 58 is dimensioned so that it may operatively engage the cylindrical bore 38 of the journal bearing 22, e.g., by pressure fit (as shown in FIG. 3), threaded engagement (as shown in FIG. 9) or equivalent, while the head 56 abuts the base 48 of the cup washer 44. As such, the interactions between the shank 58 and the interior walls of the cylindrical bore 38 connects the journal bearing 22 to the gear carrier 28. In an embodiment, the cup washer 44 and bolt 46 are dimensioned so that the head 56 fits snugly within the circumferential sidewall 50 and against the base 48. The head 56 may be entirely concealed within the cup washer 44. While FIGS. 2 and 3 depict the bolt 46 as having a smooth shank 58, in other embodiments the shank 58 may include a threaded section (not shown) and the cylindrical bore 38 may be correspondingly threaded so that the bolt 46 may be securely screwed into the journal bearing 22. In addition, the bolt 46 may include the head 56 as depicted in FIG. 2, or alternatively may include a standard bolt pattern such as a hex bolt pattern, a socket, etc. In an embodiment, the centers of the journal bearing 22 (shown as 22a in FIG. 2), the carrier opening 26 (shown as 26a in FIG. 2) and the fastening feature 32 (shown as 44a as the center of cup washer 44 and 46a as the center of bolt 46, respectively, in FIG. 2) are all aligned along axis A, providing the journal bearing assembly 20 with a double locking feature along a same axis. The locking feature may be described to be double locking because the journal bearing 22 is locked with the carrier 28 via both the anti-rotation feature 30 to block rotation of the journal bearing 22 and via the fastening feature 32 to block removal of the journal bearing from carrier 28 until such a time where said removal is desired.

Figure 4:
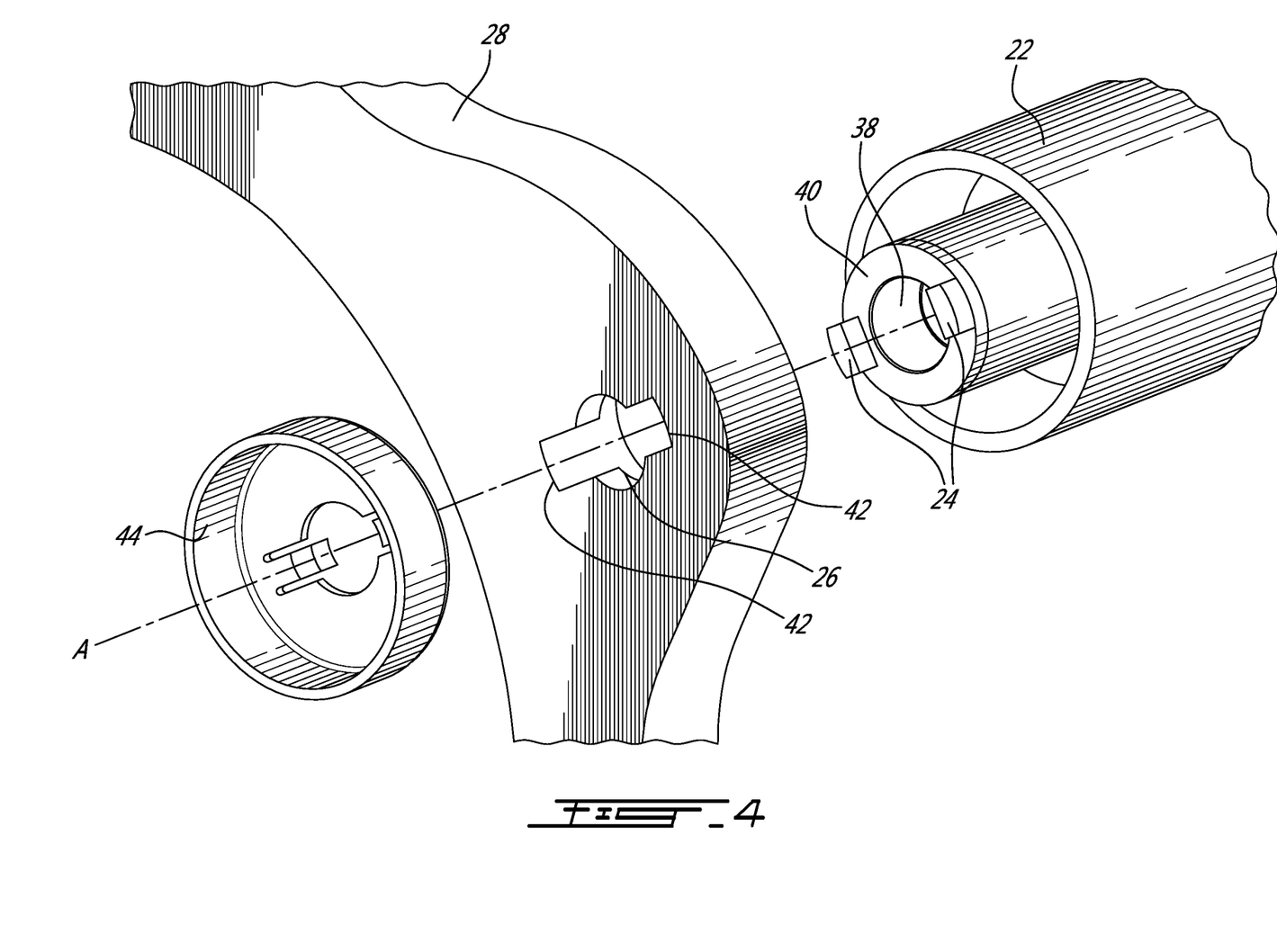
FIG. 4 is an exploded perspective view of a journal bearing assembly, according to another embodiment of the present disclosure.
Figure 5:
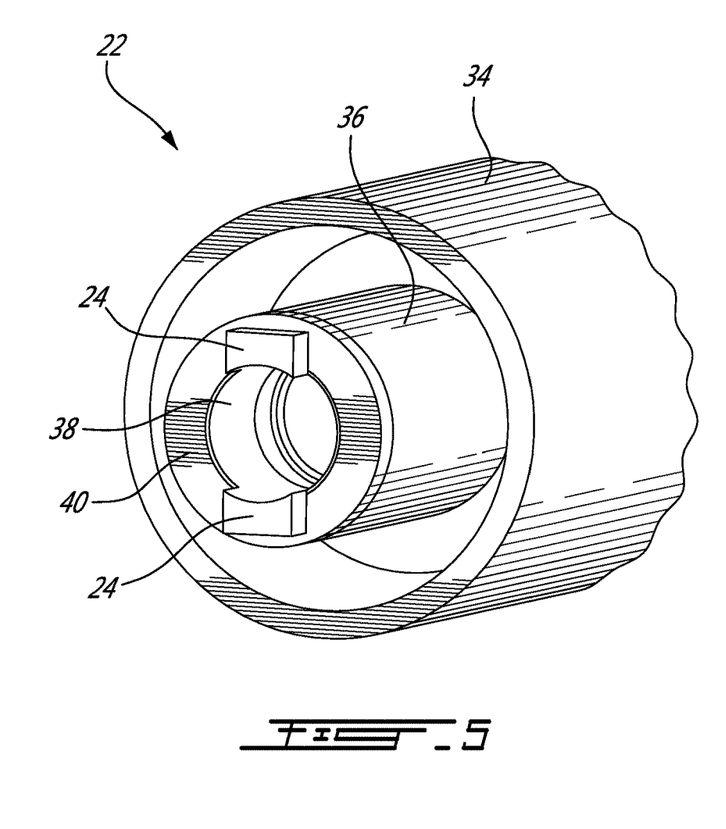
FIG. 5 is a perspective view of a journal bearing for a journal bearing assembly, according to another embodiment of the present disclosure.
Figure 6:
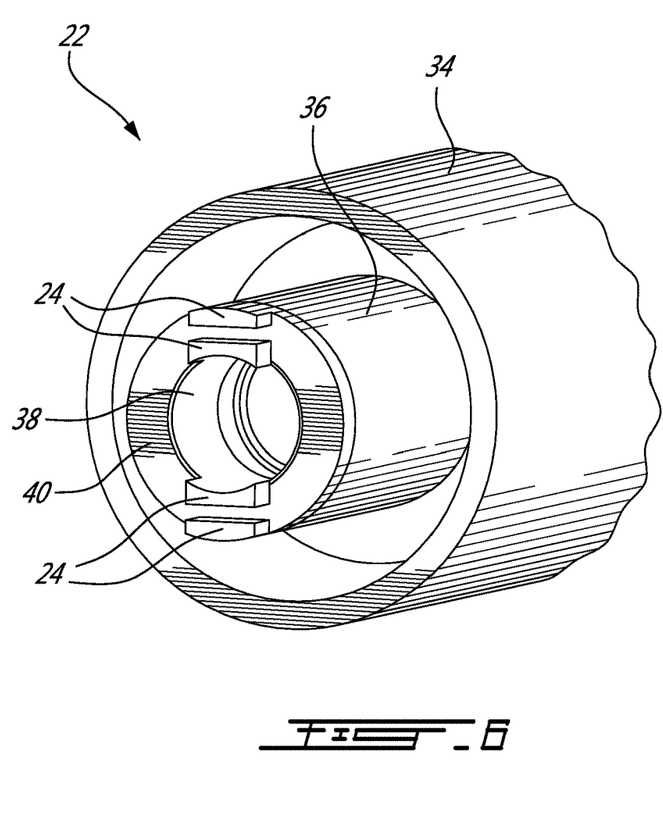
FIG. 6 is a perspective view of a journal bearing for a journal bearing assembly, according to another embodiment of the present disclosure.
Figure 7:
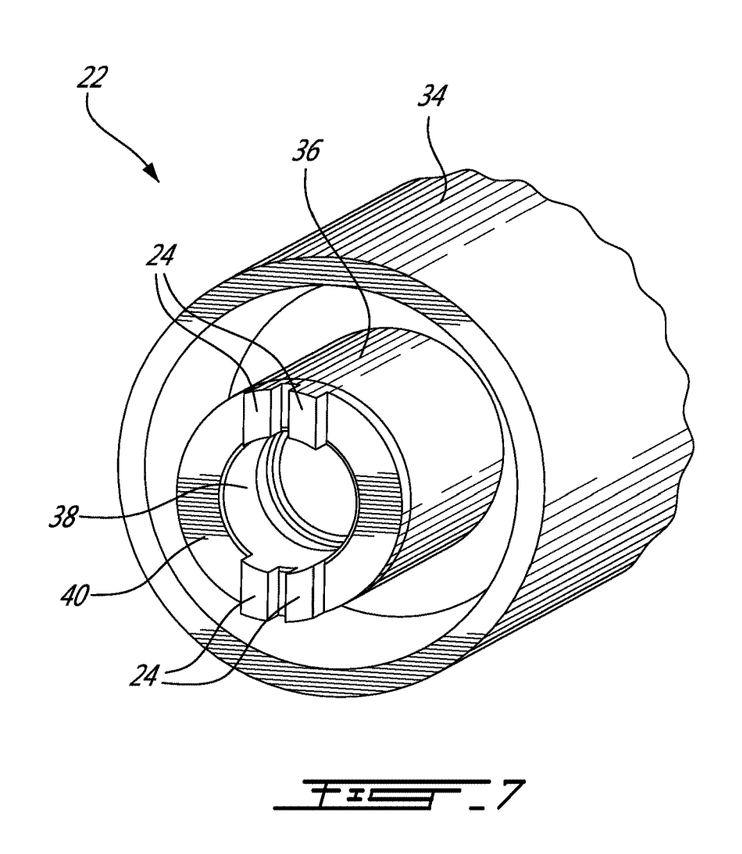
FIG. 7 is a perspective view of a journal bearing for a journal bearing assembly, according to another embodiment of the present disclosure.
Figure 8:
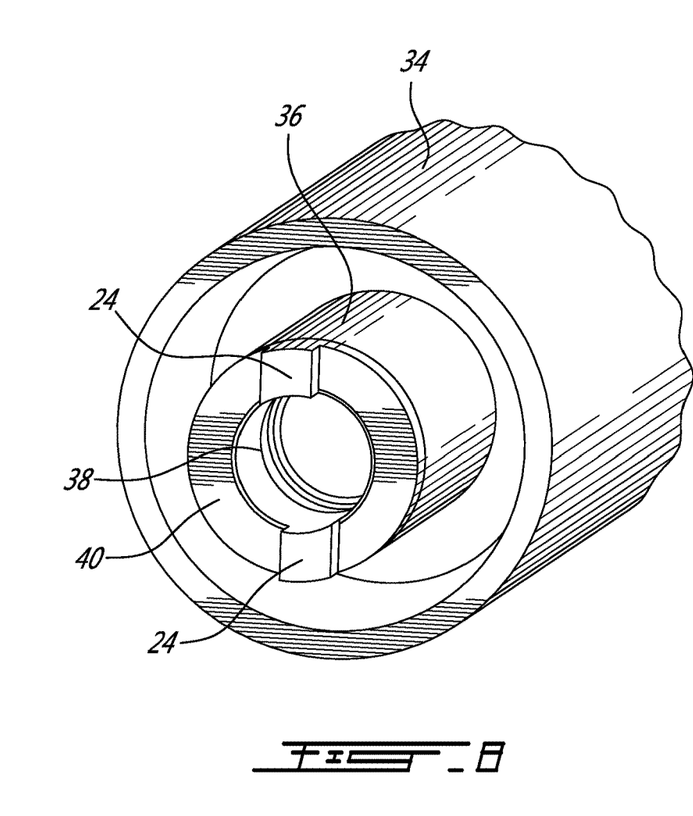
FIG. 8 is a perspective view of a journal bearing for a journal bearing assembly, according to another embodiment of the present disclosure.

Referring now to FIG. 4, in an embodiment the journal bearing 22 includes two protrusions 24 diametrically arranged about the annular end face 40. As such, the fastening feature 32 correspondingly includes two slots 42 and the cup washer 44 includes two tangs 54. In the embodiments shown in FIGS. 2 and 4, the protrusions 24 are aligned with the outer edge of the annular end face 40 so that the tangs 54 engage the inside of the protrusions 24. Alternatively, as shown in FIG. 5, in an embodiment the protrusions may be aligned with the inner edge of the annular end face 40 so that the tangs 54 engage the outside of the protrusions 24. Additionally, in the embodiment shown in FIGS. 6 and 7, the journal bearing 22 may include pairs of vertically or horizontally arranged split protrusions 24 configured to receive the tangs 54 in the space between them. Further, in the embodiment shown in FIG. 8, the protrusions 24 may be offset from a vertically arranged configuration so that they may engage the tangs 54 on opposite sides. Other possible arrangements may be implemented to ensure a secure connection between the journal bearing 22, the carrier 28 and the fastening feature 32.

In an embodiment, the present disclosure teaches a method for installing a journal bearing 22 as described above which includes an engagement feature such as one or more protrusions 24 at a distal end thereof into a gear carrier 28 of a gear system. First, the protrusion(s) 24 is inserted into an opening 26 in the gear carrier 28 which includes an anti-rotation feature 30 configured to prevent the inserted journal bearing 22 from rotating, as described above. In an embodiment, the anti-rotation feature 30 includes one or more radially-arranged slots 42 surrounding the opening 26 and through which the protrusion(s) 24 is insertable. Then, the journal bearing 22 is fastened to the gear carrier 28 via a fastening feature 32, which in an embodiment includes a cup washer 44 including one or more flexible tangs or fingers 54 which may engage with the protrusion(s) 24 and a bolt 46 insertable through the cup washer 44 and the opening 26 into a cylindrical bore 38 in the journal bearing 22.

Referring now to FIG. 9, another embodiment of a journal bearing assembly 20 is shown. Reference numbers correspond to those in FIG. 2 described above, namely a journal bearing 22 insertable into an opening 26 in a carrier 28 so that one or more protrusions 24 at a distal end of the journal bearing 22 engage with an anti-rotation feature 30, illustratively one or more radially-arranged slots 42, to prevent the journal bearing 22 from rotating about a longitudinal axis A extending along a length thereof. A fastening feature 32, illustratively a cup washer 44 and bolt 46, engage the journal bearing 22 and carrier 28 to lock the journal bearing 22 to the carrier 28. In the shown embodiment, the cylindrical bore 38 in the journal bearing 22 and the shank 58 of the bolt 46 each include threads 38*a* and 58*a*, respectively. Threads 38*a*, 58*a* are configured to be rotatably engageable so that the bolt 46 is rotatably insertable into the cylindrical bore 38 to releasably lock the journal bearing 22 to the carrier 28.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A journal bearing assembly for rotatably supporting a gear in a gear system, the journal bearing assembly comprising:
   a journal bearing for rotatably supporting the at least one gear, the journal bearing including an inner cylindrical member with an annular end face at a distal end of the journal bearing, an engagement feature at the distal end of the journal bearing, the engagement feature including at least one protrusion protruding from the annular end face, and a cylindrical bore at a center of the annular end face, the distal end of the journal bearing insertable into an opening in a gear carrier of the gear system, the opening in the gear carrier including an anti-rotation feature engageable with the at least one protrusion of the engagement feature to block the journal bearing from rotating about an axis extending longitudinally through a center of the journal bearing; and
   a fastening feature for fastening the journal bearing to the gear carrier.

2. The journal bearing assembly as defined in claim 1, wherein the at least one protrusion is radially arranged around the annular end face.

3. The journal bearing assembly as defined in claim 1, wherein the fastening feature includes a fastener insertable through the opening in the gear carrier into the cylindrical bore.

4. The journal bearing assembly as defined in claim 1, wherein the anti-rotation feature includes at least one radially-arranged slot around the opening in the gear carrier, the at least one radially-arranged slot configured to engage with the at least one protrusion.

5. The journal bearing assembly as defined in claim 4, wherein a number and a spatial arrangement of the at least one radially-arranged slot correspond to a number and a spatial arrangement of the at least one protrusion, respectively.

6. The journal bearing assembly as defined in claim 1, wherein the fastening feature includes a cup washer and a bolt.

7. The journal bearing assembly as defined in claim 6, wherein the cup washer includes at least one flexible tang engageable with the engagement feature.

8. The journal bearing assembly as defined in claim 1, wherein the center of the journal bearing is axially aligned with a center of the opening in the gear carrier and a center of the fastening feature.

9. A gear system for a gas turbine engine, comprising:
   a gear carrier defining a carrier opening extending along an axis;
   a journal bearing disposed on a first side of the gear carrier, the journal bearing removably received in the carrier opening, the journal bearing defining a bore along the axis;
   a slot in one of the carrier opening and a distal end of the journal bearing and a protrusion in the other one of the carrier opening and the distal end of the journal bearing, the slot and the protrusion mated with one another to secure the journal bearing against rotation about the axis relative to the gear carrier; and a fastening feature disposed on a second side of the gear carrier, the second side being opposite the first side, the fastening feature removably received in the bore to secure the journal bearing against movement relative to the gear carrier along the axis.

10. The gear system as defined in claim 9, wherein the gear system is a planetary gearbox comprising a sun gear, a plurality of planet gears and a ring gear.

11. The gear system as defined in claim 9, wherein the carrier opening includes a plurality of slots and the distal end of the journal bearing includes a plurality of protrusions, the plurality of protrusions received in and mated with the plurality of slots in the carrier opening.

12. The gear system as defined in claim 11, wherein a number and spatial arrangement of the plurality of slots corresponds to a number and spatial arrangement of the plurality of protrusions.

13. The gear system as defined in claim 9, wherein the fastening feature includes a cup washer and a bolt.

14. The gear system as defined in claim 9, wherein a center of the journal bearing is axially aligned with a center of the carrier opening and a center of the fastening feature.

15. A method for installing a journal bearing including an engagement feature at a distal end of the journal bearing into a gear carrier of a gear system, comprising:

inserting the distal end of the journal bearing into an opening in the gear carrier with an anti-rotation feature configured to engage with the engagement feature to block the journal bearing from rotating; and fastening the journal bearing to the gear carrier by inserting a cup washer into the opening in the gear carrier so that at least one flexible tang engages with the engagement feature and then inserting a bolt through the cup washer and through the opening in the gear carrier into a cylindrical bore at the distal end of the journal bearing.

16. The method according to claim 15, wherein inserting the distal end of the journal bearing into the opening in the gear carrier includes aligning at least one protrusion at the distal end of the journal bearing with at least one radially-arranged slot around the opening in the gear carrier and engaging each at least one protrusion with the corresponding at least one radially-arranged slot.

\* \* \* \* \*